Feb. 2, 1932.  J. HIST  1,843,229
POTATO PLANTER
Filed July 31, 1929  3 Sheets-Sheet 2
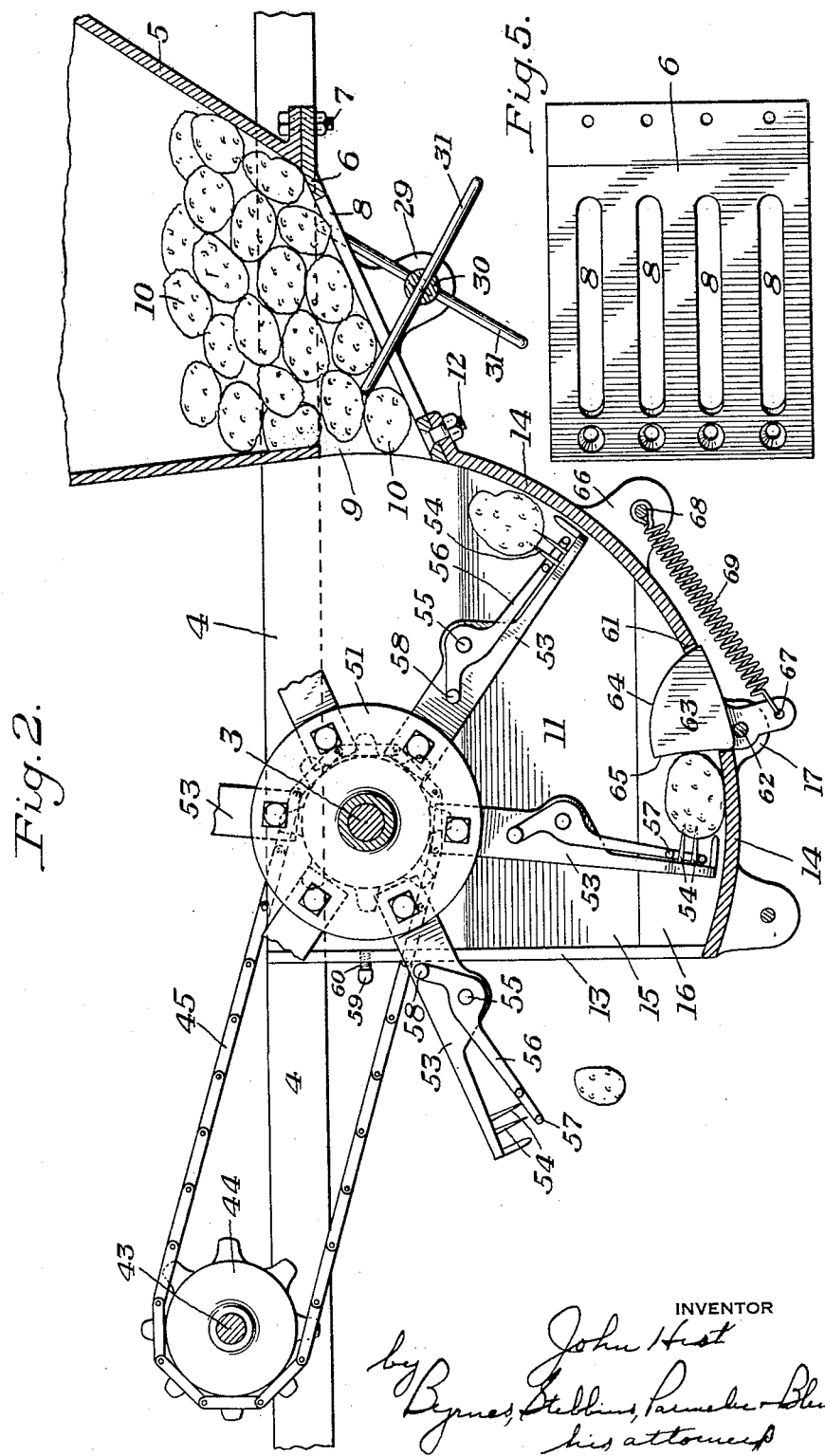

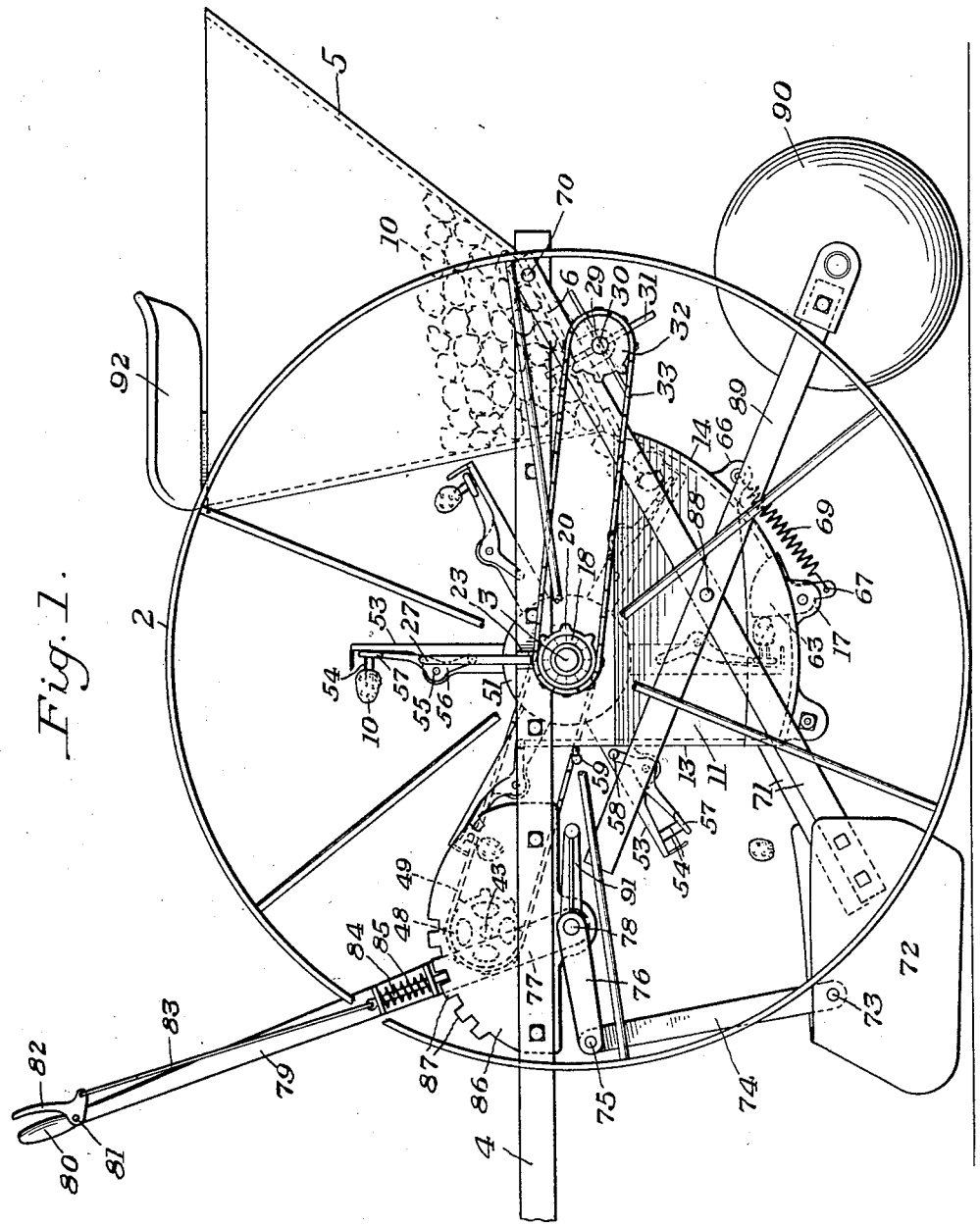

Feb. 2, 1932.   J. HIST   1,843,229
POTATO PLANTER
Filed July 31, 1929   3 Sheets-Sheet 3
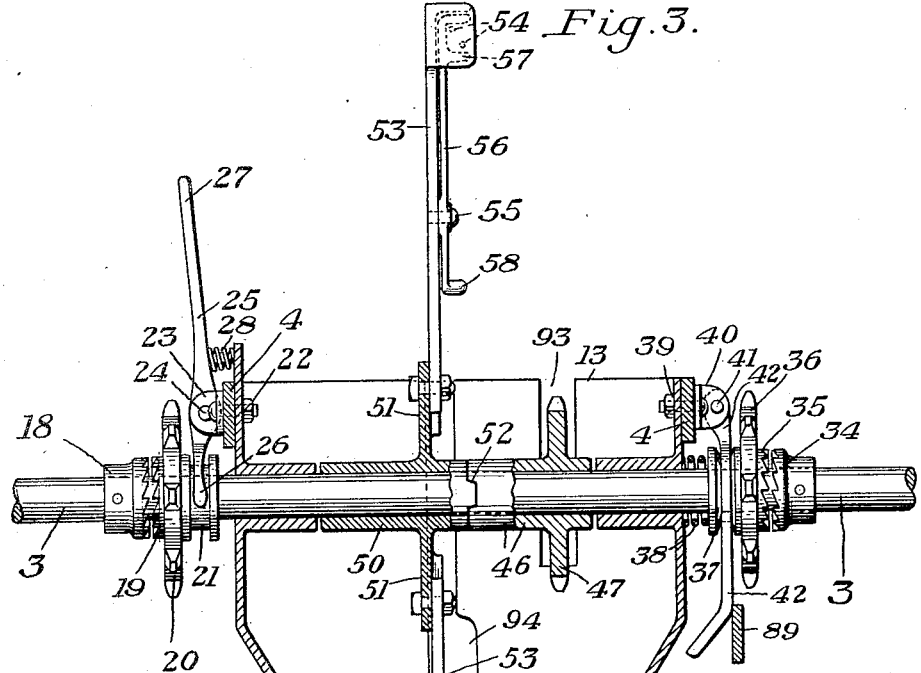
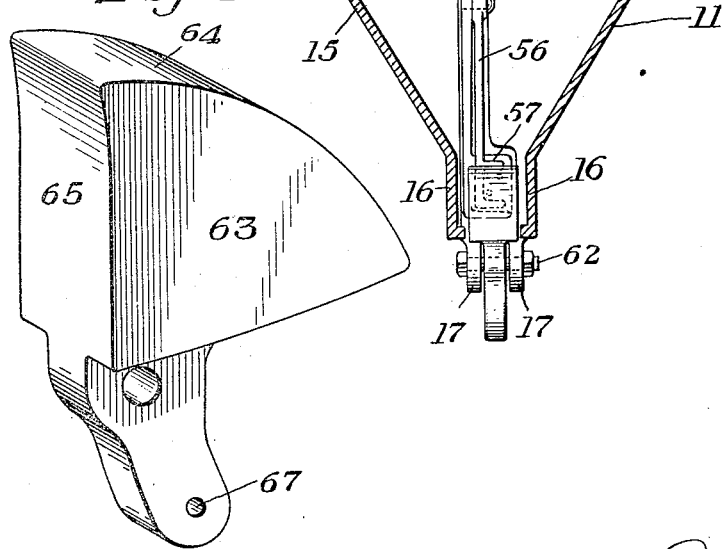
INVENTOR
John Hist
by Byrnes, Stebbins, Parmelee & Slewn
his attorneys Patented Feb. 2, 1932

1,843,229

UNITED STATES PATENT OFFICE

JOHN HIST, OF CLEVELAND, OHIO, ASSIGNOR TO THE CLEVELAND IMPLEMENT MANUFACTURING COMPANY, OF CLEVELAND, OHIO, A CORPORATION OF OHIO

POTATO PLANTER

Application filed July 31, 1929. Serial No. 382,349.

This invention relates broadly to potato planters and more particularly to potato planters of the type embodying movable potato-engaging means adapted successively to engage potatoes in a receptacle and convey such potatoes to a position where they are discharged into a furrow. It relates still more particularly to means for insuring regularity of operation of such a potato planter and means for assisting in effecting the engagement of the potatoes by the engaging means.

Potato planters are well known which embody a rotatable carrier provided with a series of arms having potato-engaging means thereon and adapted to successively engage and convey potatoes to be planted to a position where they are discharged into a prepared furrow.

The principal disadvantage of such planters as heretofore known and used has been that they are not reliable in operation and do not engage and convey potatoes to the discharge point singly and regularly. That is, there is no certainty that one potato, and only one, will be engaged by the engaging means during each engaging operation, such means often entirely missing a potato and at other times engaging two or more potatoes, whereby the efficiency of the planting is greatly reduced.

I provide a potato planter adapted to obviate the disadvantages above-mentioned in the devices in present day use. I provide a potato planter comprising movable potato-engaging means, and resilient means cooperating with the engaging means to offer resistance to potatoes while being engaged by the engaging means, the resilient means being movable out of the way of the engaged potatoes substantially in the plane of movement of the engaging means. I further provide a potato planter comprising a hopper, potato-engaging means movable therethrough, and resilient means cooperating with the engaging means for offering resistance to potatoes, such resilient means being movable to a position wherein a portion thereof forms a portion of the inner surface of the hopper.

Other objects and advantages of the invention will become apparent as the following description of a present preferred embodiment thereof proceeds.

In the accompanying drawings I have shown a present preferred embodiment of the invention wherein Figure 1 is a side elevation of a potato planter, Figure 2 is a cross-section to enlarged scale through a portion of the planter shown in Figure 1, Figure 3 is a detail view partly in cross-section of a portion of the potato planter, Figure 4 is a perspective view of an element of the planter, and Figure 5 is a detail view of a portion of the potato receiving hopper.

Referring more particularly to the drawings, reference numeral 2 designates generally a traction wheel of which there are two in spaced relationship and keyed to an axle 3. Carried by the axle 3 is a frame 4 to the front extremity of which is connected means for attaching motive power (not shown) as a team or tractor. Carried by the frame 4 is a potato receiving hopper 5 having a bottom 6 shown in detail in Figure 5. The bottom 6 is connected at its upper extremity to the hopper 5 by means of a bolt 7. The bottom is provided with a series of parallel slots 8 which are shown as being four in number. The hopper 5 has a potato outlet 9 through which potatoes 10 contained therein are adapted to pass to a second hopper or receptacle 11. The hopper 11 is connected with the hopper 5 by bolts 12 and is also connected to the frame 4. The hopper 11 comprises a substantially vertical front wall 13 and curved bottom and rear wall 14. It also has side walls 15 (see Fig. 3) which converge from the top downwardly, terminating in substantially parallel wall portions 16, each of which has at its lower extremity a lug 17.

Keyed to the shaft 3 intermediate the wheels 2 is a clutch member 18. Mounted loosely on the shaft adjacent the clutch member 18 is a complementary clutch member 19 having connected therewith a sprocket wheel 20 and a circular cam follower 21. Connected to the frame at 22 is a lug 23 to which is pivoted at 24 a cam lever 25 having a cam 26 engaging with the follower 21 and an operating handle 27. The cam lever 25 is normally urged in a direction counter-clockwise about its pivot 24 by means of a coil spring 28 bearing between the operating handle 27 and the frame, as shown in Fig. 3. Movement of the operating handle 27 to the right (viewing Fig. 3) against the action of the spring 28 causes engagement of the complementary clutch members 18 and 19 and consequent rotation of the sprocket wheel 20.

Journaled beneath the hopper 5 in bearings 29 is a shaft 30. Connected with the shaft 30 at spaced intervals and adapted to pass through the parallel slots 8 of the hopper bottom 6 are baffle members 31. These baffle members are preferably staggered with respect to one another, as shown in Fig. 2, the baffle member for one of the slots 8 engaging the shaft 30 at right angles to that for an adjacent slot. The baffle members 31 pass through the slots 8 as shown in Fig. 2 and are adapted, as will be presently described, for controlling the passage of potatoes through the outlet 9 of the hopper.

Keyed to the shaft 30 and in alinement with the sprocket wheel 20 is a sprocket wheel 32. Passing around the sprocket wheels 20 and 32 is a sprocket chain 33. Thus when the clutch members 18 and 19 are engaged the sprocket wheel 32 is rotated through the agency of the sprocket wheel 20 and the chain 33, thereby rotating the shaft 30 and consequently the baffle members 31.

While the clutch members 18 and 19 are out of engagement, that is, in the position shown in Fig. 3, movement of the machine upon the wheels 2 and consequently rotation of the shaft 3 will have no effect upon the potatoes 10 in the hopper 5, the stationary baffle members 31 serving positively to prevent passage of the potatoes through the outlet 9. When, however, during movement of the machine, the operating handle 27 is moved to the right (viewing Fig. 3) to engage the clutch members 18 and 19, the shaft 30 will be rotated in a counter-clockwise direction (viewing Fig. 2) thereby moving the baffle members 31 through the potatoes 10 in the hopper 5 and positively expelling potatoes through the outlet 9. The potatoes thus discharged from the hopper 5 pass into the lower receptacle or hopper 11.

Keyed to the shaft 3 is a clutch member 34 (Fig. 3). Loosely mounted on the shaft adjacent the clutch member 34 is a complementary clutch member 35 having connected therewith a sprocket wheel 36 and a circular cam follower 37. Mounted between the frame and the follower 37 is a coil spring 38 tending at all times to move the assembly comprising the clutch member 35, the sprocket wheel 36 and the cam follower 37 to the right or into engagement with the clutch member 34. Mounted on the frame at 39 is a lug 40 to which is pivoted at 41 a cam lever 42. The cam lever 42 engages the circular cam follower 37 so that movement of the lever about its pivot 41 causes engagement or disengagement of the clutch members 34 and 35.

Mounted in the frame forward of the shaft 3 is a shaft 43 to which is keyed a sprocket wheel 44. Meshing with the sprocket wheels 36 and 44 is a sprocket chain 45. Normally, when the clutch members 34 and 35 are in engagement, forward motion of the machine and consequent rotation of the shaft 3 causes, through the sprocket wheel 36, the chain 45 and the sprocket wheel 44, rotation of the shaft 43. When, however, the clutch members 34 and 35 are held out of engagement by a pressure exerted on the cam lever 42 toward the left, as shown in Fig. 3, movement of the machine will have no effect on the shaft 43.

Loosely mounted on the shaft 3 is a sleeve 46 carrying a sprocket wheel 47. Keyed to the shaft 43 in alinement with the sprocket wheel 47 is a sprocket wheel 48 between which and the sprocket wheel 47 extends a sprocket chain 49 (see Fig. 1) which passes through an opening 93 provided in the wall 13 of the hopper 11 (see Fig. 3). Thus rotation of the shaft 43 causes rotation of the sleeve 46.

Loosely mounted on the shaft 3 is a sleeve 50 to which is connected a circular carrier 51. The sleeve 50 is connected with the sleeve 46 at 52 so that the two sleeves rotate together as a unit. Connected with the carrier 51 is a series of arms 53, which arms are equally spaced and extend radially from the carrier. Each arm has at its extremity a number of pins 54 adapted upon counter-clockwise rotation of the carrier 51 to engage potatoes in the bottom of the hopper 11, as will be presently described. Pivoted to each arm 53 as at 55 is a stripping lever 56 having at its extremity and cooperating with the pins 54 stripping mechanism 57, whereby upon counter-clockwise rotation of the stripping lever about its pivot 55, a potato held by the pins 54 will be stripped off, as will be presently described. The opposite extremity of each stripping lever 56 carries a cam follower 58 adapted upon rotation of the carrier 51 to engage an adjustable cam 59 connected with a screw 60 in the wall 13 of the hopper 11, whereby to effect rotation of the stripping lever 56 to strip a potato from the pins 54.

The bottom of the hopper 11 is provided with an opening 61 adjacent the lugs 17 and between such lugs passes a bolt 62 serving as a pivot for a potato resisting member 63 (see Fig. 4). The resisting member 63 comprises a rounded face 64 and a slightly concavely curved face 65. Connected with the bottom of the hopper 11 is a lug 66. Connected with the resisting member 63 at 67 and with the lug 66 at 68 is a coil spring 69 resiliently holding the member 63 in the position shown in Fig. 2 wherein a portion of its face 65 abuts against an edge of the opening 61. The member 63 serves at all times to close the opening 61, whereby to prevent any potatoes from passing out through such opening. The member 63 also serves as a resilient stop to offer resistance to potatoes being engaged by the pins 54 on the arms 53, as will be presently described.

Pivoted to the frame 4 at 70 is a pair of oppositely disposed arms 71 connected at their lower extremities with a plow 72. Pivotally connected to the plow 72 at 73 is a link 74 which, in turn, is pivoted at 75 to the short arm 76 of a bell crank lever 77 rotatably mounted in the frame at 78. The long arm 79 of the bell crank lever 77 comprises an operating handle 80 to which is pivoted at 81 a grip control 82 connected through a rod 83 with a plunger 84. The plunger 84 is urged downwardly by a spring 85. Connected with the frame 4 is a plate 86 having teeth 87 between which the plunger 84 is adapted to engage to hold the bell crank lever 77 in desired adjusted positions.

Pivoted to each of the arms 71 at 88 is an arm 89 having journaled at its lower extremity a disc 90. The upper extremity of each arm 89 extends near the pivot 78. Mounted to turn with the bell crank lever 77 is a pair of cams 91, one immediately above the extremity of each arm 89. Movement of the bell crank lever 77 in a clockwise direction about its pivot 78 causing raising of the plow 72 and of the discs 90, the cams 91 forcing the upper extremities of the respective arms 89 downwardly, whereby the lower extremities of such arms move upwardly about the pivot 88.

The operation of the device is as follows: The planter is moved forward (that is toward the left, viewing Fig. 1) by its motive force, the entire planter being carried upon the wheels 2. Normally the hopper 5 contains a number of potatoes 10 which may be and preferably are portions of potatoes each containing one or more eyes. They are shown in the drawings as whole potatoes for simplicity. Normally the baffle members 31, when not rotating, maintain the potatoes or portions thereof in the hopper 5 and prevent any of them from passing out through the outlet 9.

In commencing the planting operation, the bell crank lever 77 is moved in a counterclockwise direction about its pivot 78, whereby to lower the plow 72 and the discs 90 so that the plow and the discs are below the surface of the ground. The plow makes the furrow into which the potatoes are to be dropped by the machine and the discs 90 which are inclined toward the furrow fill in the dirt after the potatoes have been planted.

As shown in Fig. 3, one of the arms 89, when the plow and discs are held in their raised position, contacts with the cam lever 42, holding such lever to the left (viewing Fig. 3) and hence holding the clutch members 34 and 35 out of engagement with each other. When, however, the plow and discs are lowered, the member 89 is no longer in engagement with the cam lever 42, so that the spring 38 is permitted to cause the clutch members 34 and 35 to engage one another. Therefore, upon forward movement of the machine the carrier 51 is rotated in the same direction as the wheels 2.

The operator moves the handle 27 toward the right (viewing Fig. 3) whereby to engage the clutch members 18 and 19 and thus cause rotation of the shaft 30 in a counterclockwise direction, thereby positively feeding potatoes from the hopper 5 into the hopper 11. This feeding need be continued only for a short period, as sufficient potatoes are fed into the hopper 11 to last for some time. Due to the conformation of the hopper 11 the potatoes gravitate into the bottom thereof between the substantially vertical walls 16 where they lie in the path of the pins 54 as the carrier 51 rotates. Each arm 53 engages a potato as it moves into the hopper 11 through a slot 94 in the wall 13, such potato coming in contact with the member 63. The member 63 tends to stop or retard the potato while the pins 54 in the arm 53 are pressing against the potato and such pins accordingly enter it so that the potato will be carried upwardly by the arm. The potato is retarded or resisted by the member 63 only sufficiently to permit it to be firmly engaged by the pins 54. Upon continued movement of the arm and potato the member 63 is pushed out of the way against the action of the spring 69 and the arm and potato pass upwardly. After the arm and potato have passed the member 63 the spring 69 returns it to the position shown in Fig. 2 in readiness for engagement of another potato.

The distance between the walls 16 is not substantially greater than the normal size of the potatoes so that two potatoes could not get into the lower portion or channel of the hopper 11 in side-by-side relationship. If two potatoes enter the channel at the same time they will lie in end-to-end relationship with respect to the direction of movement of the arms 53, so that only one of such potatoes will be engaged by the pins 54 on any one arm, the other potato being pushed out of the way. It will fall back and be engaged by the pins on the succeeding arm as forward motion of the machine continues.

When the supply of potatoes in the hopper 11 has almost become exhausted, the operator again moves the handle 27 to feed more potatoes from the hopper 5 into the hopper 11. This is done as necessary in order to keep enough potatoes in the hopper 11 to effect continuous planting.

After leaving the resilient resisting member 63 the arms carrying the potatoes pass upwardly and rotate in a counter-clockwise direction about the axis of the shaft 3. After an arm has passed its uppermost position it moves downwardly on the forward side of the shaft, the potato being under the arm and held only by the friction of the pins 54. At such time the potato is substantially above the furrow being made by the plow 72 and immediately behind the plow. The potato is disengaged by engagement of the cam follower 58 on the stripping lever 56, whereby to move the stripping lever in a counter-clockwise direction about its pivot 55 and strip off the potato as indicated in Fig. 2. The potato drops immediately behind the plow into the furrow. The discs 90 following the plow fill in the furrow so that the potatoes thus dropped into it are completely planted and covered up.

It may be desired to vary the space between the potatoes planted in the furrow. This may be done by changing either one of the sprocket wheels 44 and 48 on the shaft 43. This shaft does not carry any other gears or sprocket wheels, so that it is a simple matter to disconnect the sprocket chain from one of the sprocket wheels, remove such wheel and place on another larger or smaller one.

When the planting is finished the bell crank lever 77 is moved in a clockwise direction about its pivot 78, thereby raising the plow 72 and the discs 90 and causing engagement of one of the arms 89 with the cam lever 42, whereby to disconnect the clutch members 34 and 35 and cause the parts to remain stationary even though the planter is being moved forward on its wheels 2.

The potato planter herein described has been found to effect remarkably regular and uniform planting. This is apparently on account of the narrow channel between the walls 16 at the bottom of the hopper 11 where the potatoes have to fall after being fed from the hopper 5 and because of the provision of the member 63 against which the respective arms 53 operate to insure engagement of potatoes therewith. Positive control of the feed of potatoes from the hopper 5 into the hopper 11 is accomplished by the baffle members 31, which when stationary positively prevent the passage of potatoes through the outlet 9 and which, when moving, positively feed potatoes through the outlet. An operator's seat 92 is provided above the forward end of the hopper 5.

While I have shown and described a present preferred embodiment of the invention, it is to be distinctly understood that the same is not limited thereto but may be otherwise variously embodied within the scope of the following claims.

I claim:

1. In a potato planter, movable potato engaging means, and resilient means cooperating with the engaging means and having a face normally substantially perpendicular to the direction of movement of the potato engaging means while engaging a potato to offer resistance to potatoes while being engaged by the engaging means, the resilient means being movable out of the way of the engaged potatoes substantially in the plane of movement of the engaging means.

2. In a potato planter, movable potato engaging means, and resilient means positioned to substantially directly face the engaging means and cooperating therewith to offer resistance to potatoes while being engaged by the engaging means, the resilient means being movable out of the way of the engaged potatoes upon continued movement of the engaging means.

3. In a potato planter, movable potato engaging means, and resilient means having a surface approximately in depth the diameter of a potato and cooperating with the engaging means for offering resistance to potatoes, such resilient means being movable substantially in the direction of the engaged potatoes and having a portion over which such potatoes ride upon continued movement thereof.

4. In a potato planter, a hopper, potato engaging means movable therethrough, and resilient means cooperating with the engaging means and having a surface normally substantially perpendicular to the hopper wall for offering resistance to potatoes, such resilient means being movable to a position wherein such surface forms a portion of the inner surface of the hopper.

5. In a potato planter, a hopper having an opening therein, potato engaging means movable through the hopper, and resilient means cooperating with the engaging means for offering resistance to potatoes, such resilient means being disposed in the opening of the hopper and being movable through an angle approaching a right angle out of the way of the engaging means.

6. In a potato planter, a hopper, potato engaging means movable therethrough, and resilient means cooperating with the engaging means for offering resistance to potatoes, such resilient means being pivoted outside the hopper and having a portion extending within the hopper and normally lying substantially perpendicular to the path of engaged potatoes.

7. In a potato planter, a hopper having a potato receiving portion and a reduced portion not substantially wider than the normal size of potatoes contained therein and having substantially parallel sides, potato engaging means movable through such reduced portion, and resiliently mounted potato resisting means normally within such reduced portion and having a surface normally adapted to cooperate with the bottom and sides of the reduced portion to form a box for holding a potato in position to be engaged by the potato engaging means.

8. In a potato planter, a potato receiving channel not substantially wider than the normal size of potatoes contained therein, potato engaging means movable therethrough, and resilient means in the channel cooperating with the engaging means and having a face not substantially deeper than the normal diameter of the potatoes for offering resistance to potatoes, such resilient means being movable substantially in the direction of the length of the channel upon movement of the engaging means therethrough.

9. In a potato planter, a potato receiving channel not substantially wider than the normal size of potatoes contained therein, potato engaging means movable therethrough, and resilient means pivoted transversely of the channel and cooperating with the engaging means for offering resistance to potatoes in the channel, such resilient means having a potato engaging face normally substantially perpendicular to the length of the channel.

10. In a potato planter, a potato receiving channel not substantially wider than the normal size of potatoes contained therein, potato engaging means movable therethrough, the channel having an opening, and resilient potato resisting means in the opening and swingable through an angle approaching a right angle out of the way of potatoes upon continued movement thereof through the channel.

11. A potato planter comprising movable potato engaging means, and resilient potato resisting means cooperating with the engaging means, the resisting means having a surface adapted normally to be disposed substantially perpendicular to the direction of motion of the engaging means, the resisting means being adapted to yield upon engagement of the engaging means with a potato in contact with such surface.

In testimony whereof I have hereunto set my hand.

JOHN HIST.